May 4, 1965

H. B. MATTHEWS 3,181,477

POWER TRANSMISSION

Filed Sept. 14, 1961

INVENTOR.
HUGH B. MATTHEWS
BY
Barnes, Kisselle, Raisch & Choate
ATTORNEYS

May 4, 1965   H. B. MATTHEWS   3,181,477
POWER TRANSMISSION
Filed Sept. 14, 1961   4 Sheets-Sheet 2
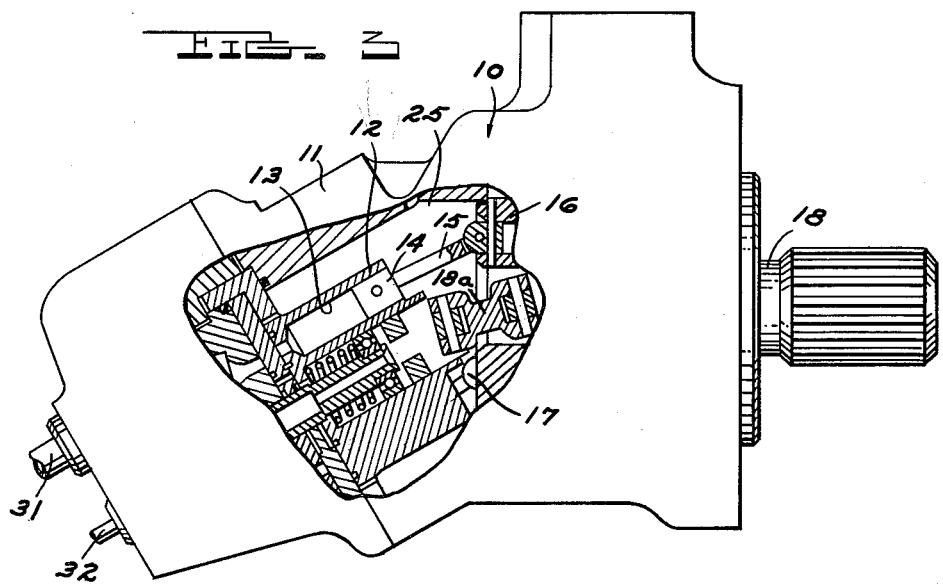
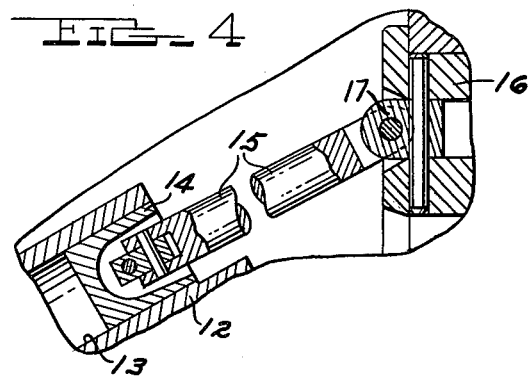
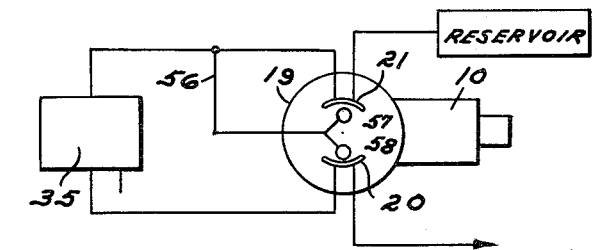
INVENTOR.
HUGH B. MATTHEWS
BY
Barnes, Kisselle, Raisch & Choat
ATTORNEYS

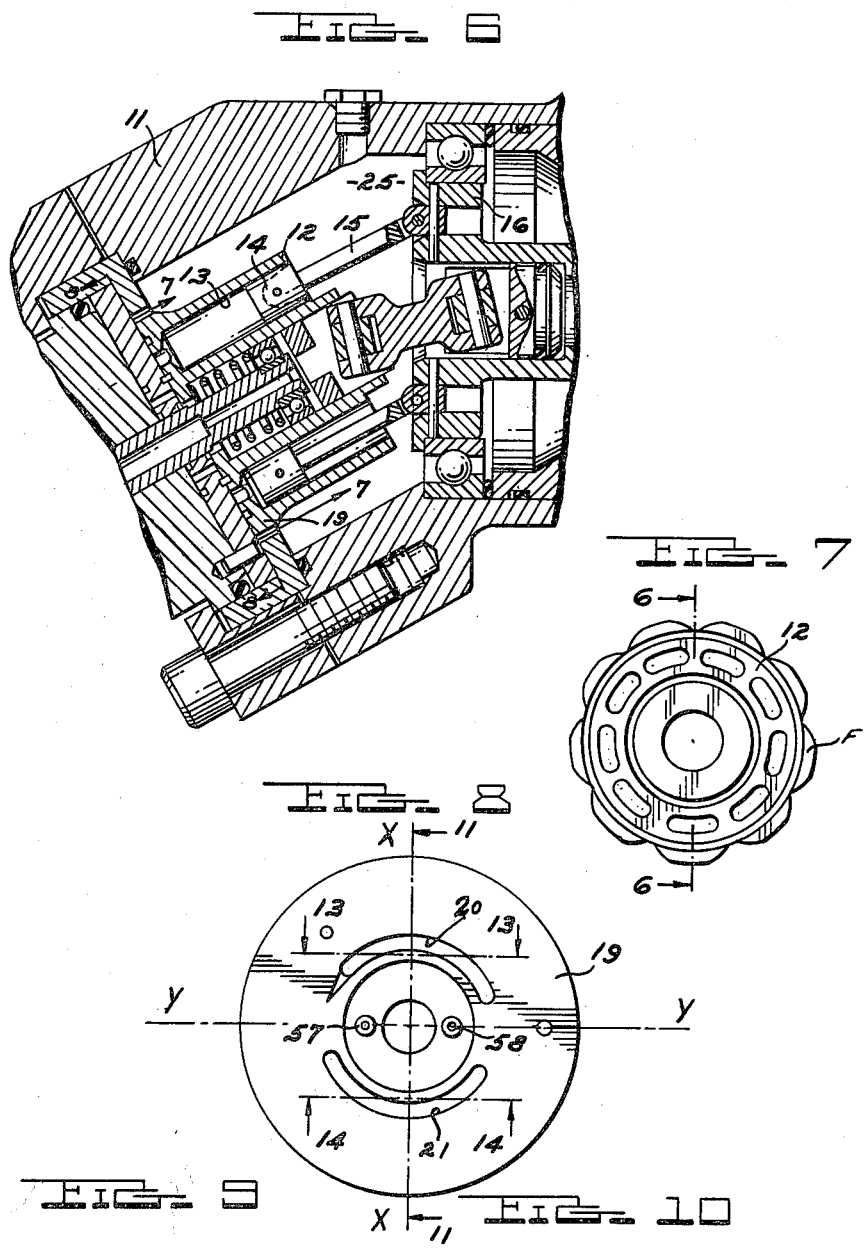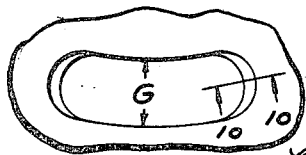
INVENTOR.
HUGH B. MATTHEWS
BY
Barnes, Kisselle, Raisch & Choate
ATTORNEYS May 4, 1965   H. B. MATTHEWS   3,181,477
POWER TRANSMISSION
Filed Sept. 14, 1961   4 Sheets-Sheet 4
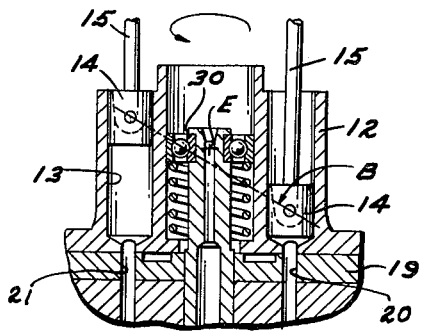
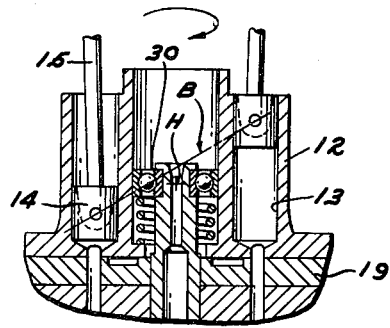
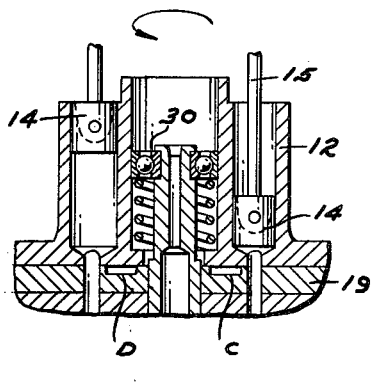
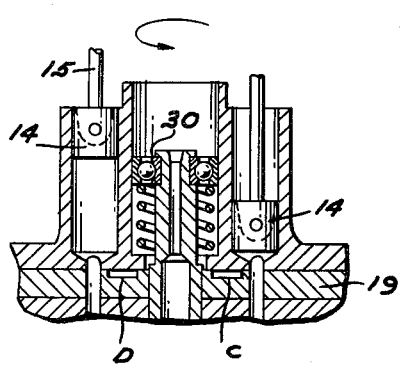
INVENTOR.
HUGH B. MATTHEWS
BY
Barney, Kiselle, Raisch & Choate
ATTORNEYS 3,181,477
POWER TRANSMISSION
Hugh B. Matthews, Birmingham, Mich., assignor to Sperry Rand Corporation, a corporation of Delaware
Filed Sept. 14, 1961, Ser. No. 138,156
10 Claims. (Cl. 103—162)

This invention relates to power transmissions and particularly to high speed pressure energy translating devices of the rotary type.

Such rotary fluid pressure energy translating devices comprise a rotatably mounted drive member, a plurality of cylinders, pistons reciprocable in the cylinders, and motion converting means interconnecting the pistons and the drive member. An inlet and an outlet communicate successively with one of the ends of each cylinder. When such a device is operated as a motor by applying fluid under pressure to the inlet, the motion converting means changes the reciprocating motion of the pistons to rotation of the drive member. When such a device is operated as a pump by rotating the drive member, the motion converting means changes the rotation of the drive member into reciprocating motion of the pistons to pump fluid from the inlet to the outlet.

When such a device is operated either as a motor or as a pump, the pressure within the housing of the device, that is, the pressure adjacent the other ends of the cylinders, usually corresponds to the tank or reservoir pressure. This produces unbalanced and high bearing loads in the device and, because of the pressures of the fluid on the ends of the pistons in the cylinders, leakage of fluid takes place past the pistons and the interface between the cylinder block and valve plate. This leakage not only results in a lessened efficiency, but, in addition, in heat losses. Such losses become quite critical in applications where the dissipation of heat is a problem as, for example, in high altitude work on missiles and the space vehicle.

When such a pressure energy translating device is used as a motor with a conventional four-way servo-valve, the high pressures imposed on both the inlet and outlet of the motor necessitate a high break-away force to initiate the operation of the motor. In addition, excessive forces are placed on the motor resulting in wear on the surface of the cylinders and scrubbing of the piston walls. The valve plate which abuts the cylinder block forming the cylinders is also subject to excessive wear.

Another problem that exists with such pressure energy translating devices is that when it is not convenient from the design standpoint to place the center of the bearing of the cylinder block in the plane of the pivots of the connecting rods to the pistons, tipping forces or moments occur in diametral planes intersecting the inlet and outlet passages. These tipping moments tend to move the cylinder block out of engagement with the valve plate resulting in pressure loss, heat and resultant inefficiency.

In addition, when such pressure energy translating devices are operated at high speeds either as motors or pumps, centrifugal force causes substantial tipping forces or moments in a diametral plane between the inlet and outlet passages. It is desirable to eliminate these forces in order to minimize leakage and heat losses and insure more efficient operation.

It is an object of this invention to provide a rotary pressure energy translating device which overcomes the aforementioned difficulties, which tends to balance the bearing loads thereby simplifying the bearing design, and which diminishes leakage thereby minimizing heat problems.

It is a further object of the invention to provide a pressure energy translating device which has a low break-away force when used as a motor in connection with a four-way servo valve.

It is a further object of the invention to provide such a pressure energy translating device which can be made in a smaller package and lighter in weight.

It is a further object of the invention to provide such a device which has improved efficiency and minimum variation in torque.

It is a further object of the invention to provide such a pressure energy translating device wherein the tipping moments due to placement of the center of the bearing out of the plane of the pivots of the connecting rods to the pistons are substantially eliminated.

It is a further object of the invention to provide a pressure energy translating device wherein the tipping moments due to centrifugal force are substantially eliminated.

Basically, the invention comprises pressurizing the casing of the rotary pressure energy translating device at a pressure ranging between the inlet and outlet pressure at which the device is operated. This pressure is preferably substantially equal to one-half the sum of the inlet and outlet pressures. According to the invention, this casing pressurization permits a better balance on the parts of the device and substantially relieves the forces on the main bearing. By placing a force on the bottoms of the pistons, the net force on the pistons on the high pressure side of the device is reduced and a force is applied to the bottom of the pistons on the low pressure. When the pressurization is at the preferred level, namely, one-half the sum of the inlet and the outlet pressures, the forces on side of the cylinder block are equal and opposite to the forces on the other side of the cylinder block. This permits a more compact light weight device since bearing loads are less. It also results in substantially less leakage. When the device is used as a motor, only a low break away or starting force is encountered. The device has a higher efficiency than conventional devices and has a more uniform torque.

According to the invention, in order to compensate for the tipping moments which tend to occur because of placement of the center of the bearing out of the plane of the pivot of the connecting rods to the pistons, the device is, in addition to case pressurization, provided with a counteracting couple introduced by varying the base area of the cylinder block or, alternatively, varying the size of the inlet and outlet passages in the cylinder block thereby varying the area of contact of the cylinder block with the valve plate.

In addition, case pressurization compensates for centrifugal forces on the various parts. In order to compensate for the couple which may be formed by centrifugal forces at a given speed, provision is made for urging the cylinder block toward the valve plate. This may be accomplished by providing cavities or pads at one or more points between the cylinder block and valve plate and providing high or low pressure to the pads to urge the cylinder block in a proper direction to compensate for the centrifugal couple.

In the drawings:

FIG. 3 is a part sectional fragmentary view of a fluid pressure energy translating device embodying the invention.

FIG. 4 is a fragmentary part sectional view of a portion of the device shown in FIG. 3, on an enlarged scale.

FIG. 5 is a schematic flow diagram of a modified form of the invention.

FIG. 6 is a fragmentary sectional view of a portion of the apparatus shown in FIG. 3 on an enlarged scale and taken generally along the line 6—6 in FIG. 7.

FIG. 7 is a view of the cylinder block taken along the line 7—7 in FIG. 6.

FIG. 8 is a view of the valve plate taken along the line 8—8 in FIG. 6.

FIG. 9 is a fragmentary view of a portion of the cylinder block as shown in FIG. 7.

FIG. 10 is a fragmentary sectional view taken along the line 10—10 in FIG. 9.

FIG. 11 is a partly diagrammatic sectional view similar to FIG. 6 and taken along the line 11—11 in FIG. 8 representing the tipping moments in the device with the bearing member in one position.

FIG. 12 is a view similar to FIG. 11 with the bearing in another position.

FIG. 13 is a partly diagrammatic sectional view taken along the line 13—13 in FIG. 8 representing the centrifugal couple on the device.

FIG. 14 is a view similar to FIG. 13 taken along the line 14—14 in FIG. 8.

Figure 1:
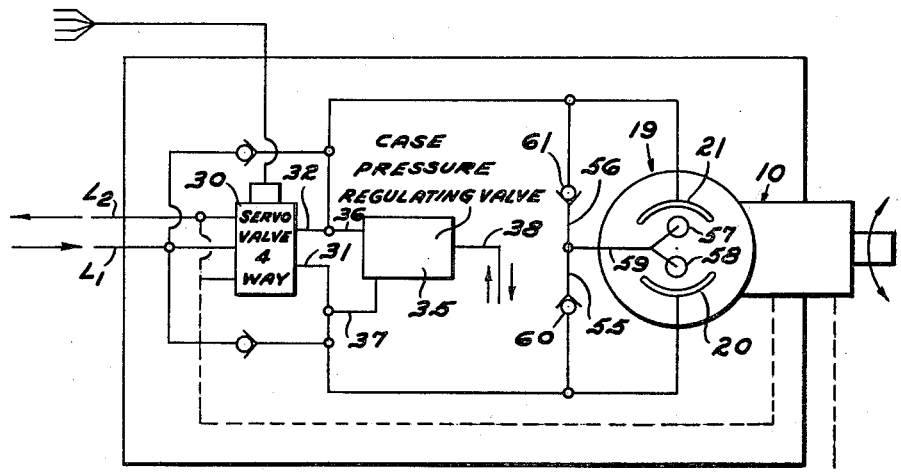
FIG. 1 is a schematic flow diagram of a motor embodying the invention.

Referring to FIGS. 3 and 6, the invention relates to a rotary fluid pressure energy translating device 10 which comprises a housing 11 and a rotatable cylinder block 12 having a plurality of cylinders 13 in which pistons 14 are reciprocably mounted. Connecting rods 15 are universally pivoted to pistons 14 at one end and are connected at the other ends thereof to a drive member 16 by universal joints 17. The drive member 16 is fixed to a drive member 18. A double Cardan universal joint 18a extends between drive member 18 and cylinder block 12 so as to maintain them in proper angular alignment.

The cylinder block 12 engages a valve plate 19 that is provided with a pair of openings 20, 21 that are successively brought into communication with the ends of the cylinders 13 (FIG. 8). When the pressure energy translating device 10 is operated as a pump, the drive member 18 is rotated and the openings 20, 21 are connected to a source of liquid and a device which is to be supplied with liquid. Rotation of drive member 18 causes pistons 14 to reciprocate and fluid is drawn through inlet opening 20 and forced out of outlet opening 21. When the device 10 is operated as a motor, fluid under pressure is provided to one of the openings 20, 21 and exhausted through the other openings 20, 21. This drives the piston 14 and, in turn, rotates the drive member 18. The direction of rotation of the motor is determined by which of the openings 20, 21 forms the inlet. The above-described arrangement is conventional.

According to the invention, the chamber which is defined by the housing 11 adjacent the ends of the cylinders 13, furthest from the inlet and outlet ends, is filled with hydraulic fluid and pressurized to a pressure which is preferably substantially one-half the sum of the pressures of the openings 20, 21.

Referring to FIG. 1, when the pressure energy translating device is operated as a motor, fluid is supplied through line $L_1$ to a four-way servo valve 30 and returned through a line $L_2$. The four-way servo valve comprises a pair of passages which are selectively connected to the inlet $L_1$ and outlet $L_2$ by positioning of the control member therein such as a spool, so that inlet and outlet pressure can be selectively provided to passages or lines 31, 32. Passage 31 connects to one of the openings 20, 21 of the pressure device and passage 32 connects to the other of the openings 20, 21 of the pressure energy translating device 10. In this manner, the motor 10 is operated in one direction or another depending upon the position of the control element in four-way valve 30.

According to the invention, pressure is applied to hydraulic fluid within the chamber 25. Referring to FIG. 1, this is achieved by a pressure regulating valve 35 which is connected by lines 36, 37 to passages 31, 32 and operates to apply a pressure substantially equal to one-half the sum of the pressures in lines 31, 32 to the chamber 25 through passage 38.

Figure 2:
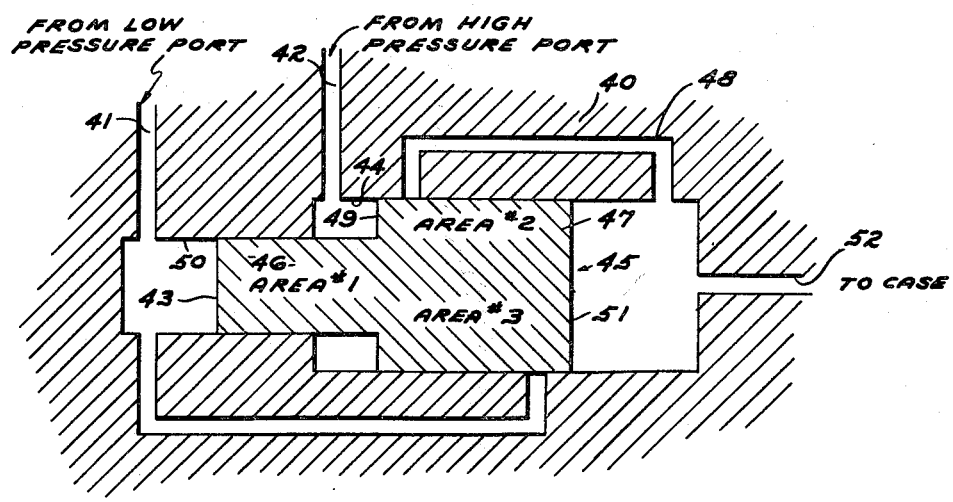
FIG. 2 is a part sectional schematic diagram of a pressure regulating valve.

The pressure-regulating valve can be of any suitable construction which will operate to provide substantially one-half the sum of the pressures. For example, as shown in FIG. 2, the valve may comprise a body 40 having passages 41, 42 that are connected to lines 36, 37. The passages 41, 42 extend to communicating chambers 43, 44, respectively. Piston 45 has a reduced portion 46 which extends into chamber 43 and an enlarged portion 47 which extends into chamber 44. The pressure in passage 41 is applied to area 50 on the end of reduced section 46 while the pressure in passage 42 is applied to the area 49 on one end of enlarged section 47. The area 49 on which the pressure from line 42 is applied is so related to the area 50, on which pressure from the line 41 is provided, and area 51, on the free end of the enlarged section 47, that the outlet pressure through outlet passage 52, which communicates with line 38, is equal to one-half the sum of the pressures in passages 41, 42. This is achieved by making the area 49 equal to the area 50 and each of these areas, in turn, equal to one-half the area 51. Such pressure-regulating valves are well-known and other type valves can be used to achieve a similar result.

Since substantial balance is achieved on either side of the cylinder block 12, it is desirable to apply a slight force tending to keep the cylinder block 12 in contact with the valve plate 19. This may be achieved by utilizing a spring such as is commonly used in rotary type pressure energy translating devices.

As shown in FIG. 8, a preferred method of maintaining the cylinder block 12 against the valve plate 19 comprises applying a reduced pressure to a cut-away or pad area 57, 58 in valve plate 19 beneath the cylinder block 12 providing a sufficient unbalance in pressure to hold the cylinder block 12 in contact with the valve plate 19. As shown in FIG. 1, this is achieved by providing lines 55, 56 which communicate with lines 31, 32, respectively, and extend to pads 57, 58 through a line 59. One way valves 60, 61 are provided in the lines 55, 56 so that only low pressure will be present in the pads 57, 58, the high pressure tending to close the respective check valve. The pads 57, 58 are provided in the valve plate adjacent the cylinder block and serve to provide areas of lower pressure so that the higher pressure on the cylinder block 12 urges it into engagement with the valve plate.

When the motor shown in FIG. 1 is operated by manipulation of the four-way valve 30, the chamber within the motor adjacent the other ends of the cylinders, referred to as 25 in FIGS. 3 and 6, is pressurized at a pressure substantially equal to one-half the sum of the inlet and outlet pressures. This arrangement provides for substantial balance of the forces upon the cylinder block 12. This permits the use of lighter weight bearings and permits the motor to be made more compact.

Since in the neutral position the four-way valve applies equal pressures to both the passages 20, 21 of the motor, and since the pressurization of the housing is equal to one-half the sum of the two pressures, the break-away force required to cause operation of the motor upon slight movement of the servo valve in one direction or another is substantially reduced. This is shown effectively in the following Table I:

*Table I*

| Test | Standard motor | Balanced motor |
|---|---|---|
| Weight (dry), lbs | 2.0 | [1] 1.7 |
| Hand torque with 0 p.s.i. on both ports, in. lbs | 0.50 | 0.72 |
| Hand torque with 1500 p.s.i. on both ports, in. lbs | 9 | 1.25 |
| Breakaway differential pressure (clockwise), p.s.i | 540 | 73 |
| Running differential pressure (clockwise), p.s.i | 372 | 44 |
| Breakaway differential pressure (counterclockwise), p.s.i | 560 | 70 |
| Running differential pressure (counterclockwise), p.s.i | 363 | 42 |
| Stalled torque, in lbs.: | | |
| Maximum | 41.8 | 42.8 |
| Minimum | 29.8 | 41.4 |
| Average | 40.57 | 41.95 |

[1] Breadboard.

It should be noted that not only is the breakaway differential pressure substantially reduced, that is, the pressure required to cause operation of the motor but, in addition, a higher stalling torque is achieved by the motor embodying the invention as contrasted to a standard motor having substantially the same size pistons and cylinders.

It has been further found that in servo valve operation, the motor embodying the invention has a higher efficiency and actual torque throughout a full range of differential pressures ranging from 350 to 3,000 p.s.i. between the inlet and outlet ports.

When the pressure energy translating device is used as a pump, the four-way valve is, of course, eliminated and the flow diagram assumes the general arrangement as shown in FIG. 5. Since the pump is rotated in one direction only, only line 56 is used. Otherwise, the circuit is substantially the same as shown in FIG. 1.

When a device embodying the circuit shown in FIG. 5 is operated as a pump, the benefits of substantial balancing of the forces are achieved as in the case of the motor operation. This eliminates the bearing loads and permits the making of a more compact package and a much more light weight device.

When the bearing is not in the same plane as the plane which connects the pivots of the connecting rods to the pistons, the unbalanced pressure forces tend to cause tipping moments in the plane intersecting the inlet and outlet commonly called the X—X plane. As shown in FIG. 11, if the bearing 30 has its center at E above the plane B connecting the pivots of the connecting rods to the pistons, then the tipping moments in the X—X plane on the connecting rods tend to cause a counterclockwise couple. This couple can be compensated for by providing a clockwise couple in the general X—X plane by either decreasing the base area F of the cylinder block or increasing the radial width G of the inlet and outlet kidney slots 20, 21 in the valve plate 19 (FIGS. 7, 9). The side of slots 20, 21 are tapered as shown in FIG. 10.

Similarly, if the bearing is at H below the plane B, as shown in FIG. 12, the tipping moments in the X—X plane are in a clockwise direction and a compensating couple can be provided by increasing the base area F or decreasing the width G of the kidney slot.

The centrifugal couple which occurs at high speeds in the plane intersecting the inlet and outlet can be more readily understood by the partly diagrammatic representation in FIG. 13 which is a section along the line 13—13 in FIG. 8. As shown in FIG. 13, in the plane at a right angle to the X—X plane commonly called the Y—Y plane, the connecting rods are toed out. If the bearing has its center at E above the plane B connecting the pivots of the connecting rods to the pistons, then the forces due to centrifugal force tend to cause a couple in a counterclockwise direction. This may be relieved by providing a pad as shown at C and introducing low pressure to the pad so that the right-hand portion of the cylinder block is urged toward the valve plate. Another pad D may be provided on the left-hand side of the cylinder block and high pressure supplied to that pad in order to further urge the cylinder block in a clockwise direction compensating for the centrifugal couple in a counterclockwise direction. In a plane intersecting the inlet and outlet passages along the line 14—14 in FIG. 8, a similar moment is formed at the section as shown in FIG. 14 and can be compensated for in a similar manner by pads C and D. The passages to the pads are not shown but can be readily provided in the valve plate 19 extending to the inlet or outlet.

It can thus be seen that both the centrifugal tipping moments and tipping moments due to displacement of the bearing out of the plane connecting the pivots of the connecting rods to the pistons can be compensated for by a combination of case pressurization and control of the forces between the cylinder block and valve plate resulting in a more efficient pressure energy translating device.

I claim:

1. In a hydraulic system, the combination comprising a housing, a rotary fluid pressure energy translating device in said housing, said device being of the type having a rotatable drive member, a cylinder block rotatably mounted in said housing and having a plurality of axially positioned cylinders, pistons reciprocable in said cylinders, and motion converting means interconnecting the reciprocating pistons to the rotatable drive member, said housing having an inlet and an outlet communicating successively with one end of each said cylinder, said housing defining a chamber at the end of said cylinder block remote from said inlet and said outlet adjacent the other ends of said cylinders, said pistons having portions exposed to hydraulic fluid in said chamber, and pressure regulating means communicating with said inlet, said outlet, and said chamber for continuously applying a pressure to hydraulic fluid in said chamber and in turn to said cylinder block and said pistons, said pressure having a substantially constant magnitude ranging between the inlet pressure and the outlet pressure.

2. In a hydraulic system, the combination comprising a housing, a rotary fluid pressure energy translating device in said housing, said device being of the type having a rotatable drive member, a cylinder block rotatably mounted in said housing and having a plurality of axially positioned cylinders, pistons reciprocable in said cylinders, and motion converting means interconnecting the reciprocating pistons to the rotatable drive member, said housing having an inlet and an outlet communicating successively with one end of each said cylinder, said housing defining a chamber at the end of said cylinder block remote from said inlet and said outlet adjacent the other ends of said cylinders, said piston having portions exposed to hydraulic fluid in said chamber, and pressure regulating means communicating with said inlet, said outlet and said chamber for continuously applying a pressure to hydraulic fluid in said chamber and in turn to said cylinder block and said pistons, said pressure having a magnitude equal to substantially one-half the sum of the inlet pressure and the outlet pressure.

3. The combination set forth in claim 2 including a valve plate contacting the end of said cylinder block, means defining spaces between said cylinder block and said valve plate, said spaces communicating with the inlet to produce a pressure differential urging said cylinder block against said valve plate.

4. The combination comprising a four-way servo valve, means for continuously supplying hydraulic fluid under pressure to said servo valve, said servo valve being of a type having an inlet port and an outlet port, said inlet port communicating with said source, said four-way valve having a pair of passages selectively connected to said inlet and outlet ports, a housing, a rotary fluid pressure energy translating motor in said housing, said device being in of the type having a drive member, a cylinder block rotatably mounted in said housing and having a plurality of axially positioned cylinders, pistons reciprocable in said cylinders, and motion converting means for converting the reciprocating motion of the pistons to rotation of said drive member, said housing having a pair of openings connected to said passages and communicating successively with one end of each said cylinder, means defining a chamber at the end of said cylinder block remote from said inlet and said outlet adjacent the other ends of said cylinders, and pressure regulating means communicating with said openings and said chamber for continuously applying a pressure to hydraulic fluid is said chamber and in turn to said cylinder block and said pistons, said pressure having a substantially constant magnitude ranging between the inlet pressure and the outlet pressure of said device.

5. The combination comprising a four-way servo valve, means for continuously supplying hydraulic fluid under pressure to said servo valve, said servo valve being of a type having an inlet port and an outlet port, said inlet port communicating with said source, said four-way valve having a pair of outlet passages selectively connected to said inlet and outlet ports, the combination comprising a housing, a rotary fluid pressure energy translating motor in said housing, said device being of the type having a drive member, a cylinder block rotatably mounted in said housing and having a plurality of axially positioned cylinders, pistons reciprocable in said cylinders, and motion converting means for converting the reciprocating motion of the pistons to rotation of said drive member, said housing having a pair of openings connected to said passages and communicating successively with one end of each said cylinder, and pressure regulating means communicating with said opening and said chamber at the end of said cylinder block remote from said inlet and said outlet adjacent the opposite ends of said cylinder for continuously applying a pressure to hydraulic fluid in said chamber and in turn to said cylinder block and said pistons, said pressure having a magnitude equal to substantially one-half the sum of the inlet pressure and the outlet pressure.

6. The combination set forth in claim 5 including a valve plate contacting the end of said cylinder block, means defining spaces between said cylinder block and said valve plate, said spaces communicating with the low pressure inlet to produce a pressure differential urging said cylinder block against said valve plate.

7. In a hydraulic system, the combination comprising a housing, a rotary fluid pressure energy translating device in said housing, said device being of the type having a rotatable drive member, a cylinder block, a bearing rotatably mounting said block in said housing, said cylinder block having a plurality of axially positioned cylinders, pistons reciprocable in said cylinders, and motion converting means interconnecting the reciprocating pistons to the rotatable drive member and including connecting rods pivoted to said pistons in a substantially common plane, the center of said bearing lying outside said common plane, a valve plate in said housing having an inlet and an outlet communicating successively with one end of each said cylinder, said housing defining a chamber at the end of said cylinder block remote from said inlet and said outlet adjacent the other ends of said cylinders, said pistons having portions exposed to hydraulic fluid in said chamber, pressure regulating means communicating with said inlet, said outlet, and said chamber for continuously applying a pressure to hydraulic fluid in said chamber and in turn to said cylinder block and said pistons, said pressure having a substantially constant magnitude ranging between the inlet pressure and the outlet pressure, and at least one pad comprising a cavity between said cylinder block and said valve plate, and passage means for providing fluid under pressure from one of said inlet or said outlet to said pad.

8. In a hydraulic system, the combination comprising a housing, a rotary fluid pressure energy translating device in said housing, said device being of the type having a rotatable drive member, a cylinder block, a bearing rotatably mounting said block in said housing, said cylinder block having a plurality of axially positioned cylinders, pistons reciprocable in said cylinders, and motion converting means interconnecting the reciprocating pistons to the rotatable drive member and including connecting rods pivoted to said pistons in a substantially common plane, said bearing having its center lying out of said common plane, a valve plate in said housing having an inlet and an outlet communicating successively with one end of each said cylinder, said housing defining a chamber at the end of said cylinder block remote from said inlet and said outlet adjacent the other ends of said cylinders, said pistons having portions exposed to hydraulic fluid in said chamber, pressure regulating means communicating with said inlet, said outlet, and said chamber for continuously applying a pressure to hydraulic fluid in said chamber and in turn to said cylinder block and said pistons, said pressure having a substantially constant magnitude ranging between the inlet pressure and the outlet pressure, the area of the contacting surface of said cylinder block with said valve plate and the radial width of said inlet and outlet passages in said valve plate being interrelated in such a manner as to compensate for the tipping moment due to the displacement of the bearing out of said common plane.

9. In a hydraulic system, the combination comprising a housing, a rotary fluid pressure energy translating device in said housing, said device being of the type having a rotatable drive member, a cylinder block, a bearing rotatably mounted in said housing, said cylinder block having a plurality of axially positioned cylinders, pistons reciprocable in said cylinders, and motion converting means interconnecting the reciprocating pistons to the rotatable drive member, and including connecting rods pivoted to said pistons in a substantially common plane, a valve plate in said housing having an inlet and an outlet communicating successively with one end of each said cylinder, said bearing having its center lying out of said plane and between said plane and said valve plate, said housing defining a chamber at the end of said cylinder block remote from said inlet and said outlet adjacent the other ends of said cylinders, said pistons having portions exposed to hydraulic fluid in said chamber, pressure regulating means communicating with said inlet, said outlet, and said chamber for continuously applying a pressure to hydraulic fluid in said chamber and in turn to said cylinder block and said pistons, said pressure having a substantially constant magnitude ranging between the inlet pressure and the outlet pressure, the area of the contacting surface of said cylinder block with said valve plate and the radial width of said inlet and outlet passages in said valve plate being interrelated in such a manner as to compensate for the tipping moment due to the displacement of the bearing out of said common plane.

10. In a hydraulic system, the combination comprising a housing, a rotary fluid pressure energy translating device in said housing, said device being of the type having a rotatable drive member, a cylinder block, a bearing rotatably mounted in said housing, said cylinder block having a plurality of axially positioned cylinders, pistons reciprocable in said cylinders, and motion converting means interconnecting the reciprocating pistons to the rotatable drive member, and including connecting rods pivoted to said pistons in a substantially common plane, a valve plate in said housing having an inlet and an outlet communicating successively with one end of each said cylinder, said bearing having its center lying out of said plane and out of the area between said plane and said valve plate, said housing defining a chamber at the end of said cylinder block remote from said inlet and said outlet adjacent the other ends of said cylinders, said pistons having portions exposed to hydraulic fluid in said chamber, pressure regulating means communicating with said inlet, said outlet, and said chamber for continuously applying a pressure to hydraulic fluid in said chamber and in turn to said cylinder block and said pistons, said pressure having a substantially constant magnitude ranging between the inlet pressure and the outlet pressure, the area of the contacting surface of said cylinder block with said valve plate and the radial width of said inlet and outlet passages in said valve plate being interrelated in such a manner as to compensate for the tipping moment due to the displacement of the bearing out of said common plane.

References Cited by the Examiner

UNITED STATES PATENTS

| | | | |
|---|---|---|---|
| 951,278 | 3/10 | Janney | 103—162 |
| 1,817,080 | 8/31 | Howard | 103—162 |
| 1,867,308 | 7/32 | Durner | 103—162 |
| 2,288,768 | 7/42 | Zimmermann | 103—162 |
| 2,298,850 | 10/42 | Vickers | 103—162 |
| 2,604,856 | 7/52 | Henrichsen | 103—162 |
| 2,642,809 | 6/53 | Born et al. | 103—162 |
| 2,721,519 | 10/55 | Henrichsen | 103—162 |
| 2,733,666 | 2/56 | Poulos | 103—162 |
| 2,735,407 | 2/56 | Born | 103—162 |
| 2,779,296 | 1/57 | Dudley | 103—162 |
| 2,813,493 | 11/57 | Aspelin | 103—162 |
| 2,915,985 | 12/59 | Budzich | 103—162 |
| 2,916,334 | 12/59 | Thoma | 103—162 |
| 2,923,245 | 2/60 | Aspelin | 103—42 |
| 2,963,983 | 12/60 | Wiggermann | 103—162 |
| 2,972,962 | 2/61 | Douglas | 103—162 |
| 3,007,420 | 11/61 | Budzich | 103—162 |
| 3,046,906 | 7/62 | Budzich | 103—162 |
| 3,089,426 | 5/63 | Budzich | 103—162 |

FOREIGN PATENTS

| | | |
|---|---|---|
| 441,952 | 3/27 | Germany. |
| 539,939 | 12/31 | Germany. |
| 751,231 | 6/56 | Great Britain. |
| 865,648 | 4/61 | Great Britain. |

LAURENCE V. EFNER, *Primary Examiner.*

JOSEPH H. BRANSON, JR., *Examiner.*